US010764761B2

(12) United States Patent
Lerbour et al.

(10) Patent No.: US 10,764,761 B2
(45) Date of Patent: Sep. 1, 2020

(54) DEVICES AND METHOD FOR THE SIMULATION OF A MOBILE TELECOMMUNICATIONS NETWORK

(71) Applicant: INFOVISTA SAS, Massy (FR)

(72) Inventors: Régis Lerbour, Saint-Cyr-L'ecole (FR); Razvan Trifan, Bucharest (RO)

(73) Assignee: INFOVISTA SAS, Massy (FR)

( * ) Notice: Subject to any disclaimer, the term of this patent is extended or adjusted under 35 U.S.C. 154(b) by 0 days.

(21) Appl. No.: 15/747,047

(22) PCT Filed: Oct. 5, 2017

(86) PCT No.: PCT/EP2017/075332
§ 371 (c)(1),
(2) Date: Dec. 5, 2019

(87) PCT Pub. No.: WO2018/069139
PCT Pub. Date: Apr. 19, 2018

(65) Prior Publication Data
US 2020/0145838 A1    May 7, 2020

(30) Foreign Application Priority Data
Oct. 11, 2016  (FR) .................................... 16 59811

(51) Int. Cl.
*G06F 9/44*    (2018.01)
*H04W 16/22*   (2009.01)
(Continued)

(52) U.S. Cl.
CPC ........ *H04W 16/22* (2013.01); *H04B 17/3912* (2015.01); *H04W 16/18* (2013.01)

(58) Field of Classification Search
CPC ... H04W 16/22; H04W 16/18; H04B 17/3912
(Continued)

(56) References Cited

U.S. PATENT DOCUMENTS

2007/0064784 A1*  3/2007  Dehghan ............... H04W 24/00
                                                          375/224
2008/0161006 A1*  7/2008  Ferrato ................. H04W 16/18
                                                          455/446
(Continued)

FOREIGN PATENT DOCUMENTS

CN    103533565 B    7/2016

OTHER PUBLICATIONS

French Search Report from French Patent Application No. 1659811, dated May 19, 2017.

*Primary Examiner* — Andre Pierre Louis
(74) *Attorney, Agent, or Firm* — Greer, Burns & Crain, Ltd.

(57) ABSTRACT

A method for the simulation of a telecommunications network, starting from a series t of test scenarios, each test scenario including at least one base station, from a series s of sets of parameters of a simulation scheduler including: A/ for each test scenario $t_k$: a/ producing an emulation of the test scenario $t_k$ utilizing all the base stations of the test scenario, a base station of the network of the test scenario $t_k$, to obtain a series $I_e^{t_k}$ of indicators, b/ for each set of scheduling parameters $s_j$ of the series of sets of parameters s, producing a simulation of the test $t_k$ by the simulation scheduler with the set of parameter s j, to obtain a series $I_{s_j}^{t_k}$ of indicators, B/ calibrating the scheduling parameters $s_o$ of the scheduler with the set of parameters $s_{jmin}$ which minimizes the overall error, obtained from the indicators obtained by emulation and simulation.

7 Claims, 1 Drawing Sheet

(51) Int. Cl.
*H04B 17/391* (2015.01)
*H04W 16/18* (2009.01)
*G06F 13/10* (2006.01)

(58) Field of Classification Search
USPC .......................................................... 703/20
See application file for complete search history.

(56) References Cited

U.S. PATENT DOCUMENTS

2011/0310745 A1* 12/2011 Goria .................... H04W 24/06
370/241
2012/0052867 A1 3/2012 Kokku et al.

* cited by examiner

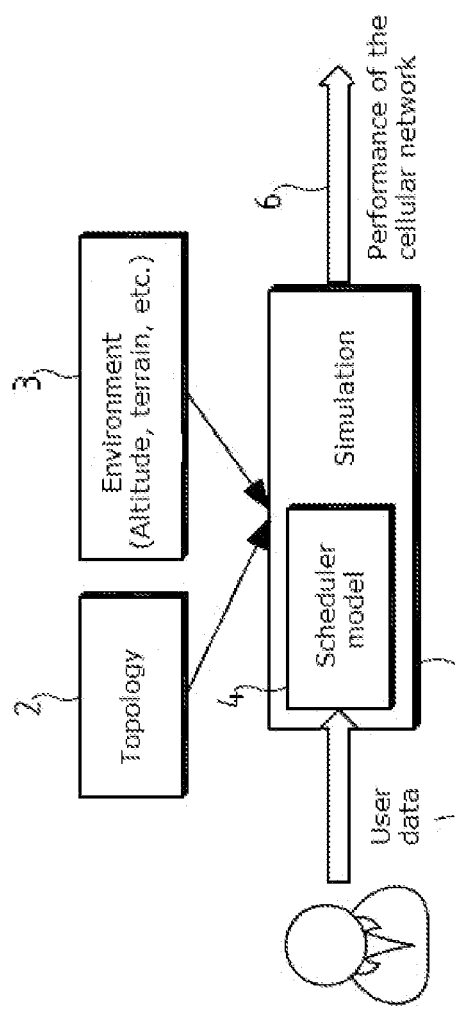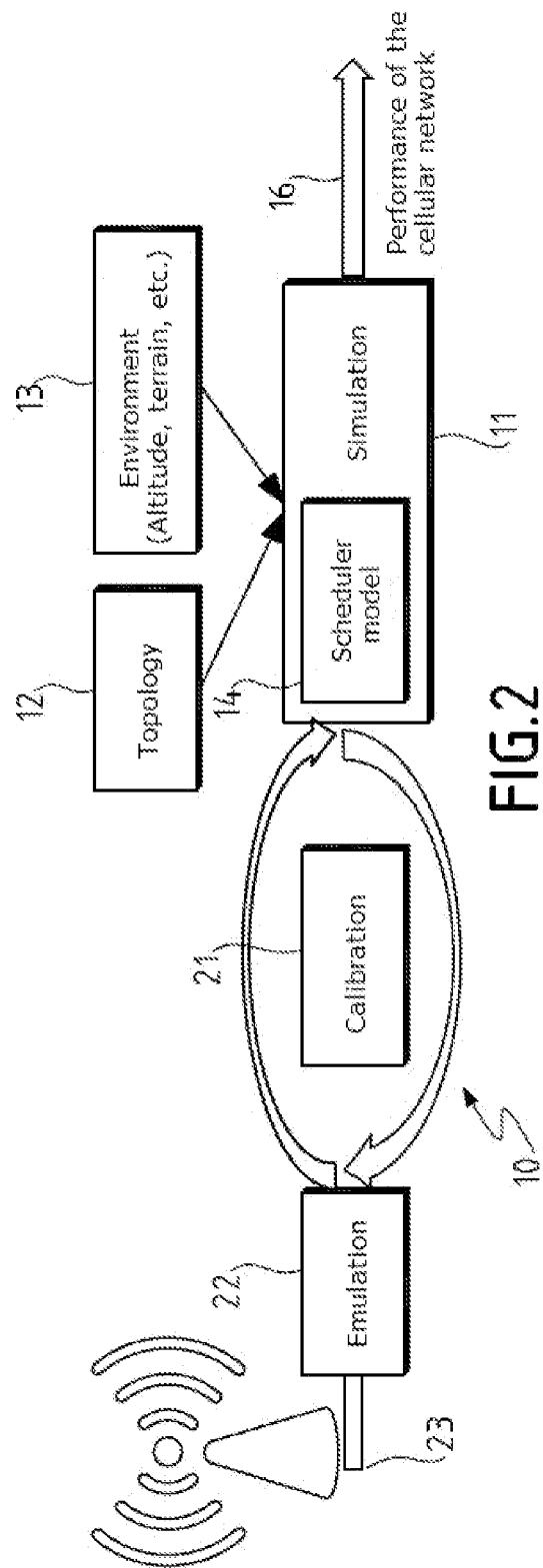

DEVICES AND METHOD FOR THE SIMULATION OF A MOBILE TELECOMMUNICATIONS NETWORK

BACKGROUND

The present invention relates to a device and to a method for the simulation of a mobile telecommunication network.

A simulation method has the objective of evaluating the capacity of a network of a mobile or cellular type to withstand the load constituted by a number of mobile users deployed in a quasi-random manner and of which the different types of requirements, for example voice, video, web, also differ in a random manner.

In a mobile network, the radio resource is the main bottleneck due to its scarcity. Each generation of mobile network brings major technological innovations for optimizing the use of this resource, while taking into account the development of uses. This development is accompanied by an increased complexity at the level of the scheduler which has the task of optimizing in a dynamic fashion the allocation of the radio resource between the different mobiles.

The flexibility of the radio access technologies, such as the 4G LTE radio interface, allows innovations at the level of the scheduling algorithms, that each equipment manufacturer exploits in order to differentiate itself from the competition.

Yet, the simulation methods according to the state of the art model the operations of the scheduler in a very generic way, depending on the type of scheduler, which does not make it possible to distinguish the different models of the manufacturers the characteristics of which are not known in detail.

A purpose of the invention is to be able to better simulate the operation of a specific base station of such a network, by better simulating the behaviour of its scheduler.

A purpose of the invention is to be able to simulate a radio network comprising such a base station in a more realistic way.

SUMMARY

At least one aim of the invention is achieved, according to a first aspect of the invention, with a method for the simulation of a scheduler of a base station of a telecommunications network implementing a radio access technology and comprising a plurality of base stations, the method comprising, starting from a series t of test scenarios, each test scenario comprising at least one base station, and from a series s of sets of scheduling parameters of a simulation scheduler:
- for each test scenario $t_k$ of the series of test scenarios t:
  - produce an emulation of the test scenario $t_k$ utilizing all the base stations of the test scenario $t_k$, in order to obtain a series $I_e^{t_k}$ of indicators,
  - for each set of scheduling parameters $s_j$ of said series of sets of scheduling parameters s, produce a simulation of the test $t_k$ by said simulation scheduler with the set of scheduling parameters $s_j$, in order to obtain a series $I_{s_j}^{t_k}$ of indicators,
- calibrate the scheduling parameters $s_o$ of the simulation scheduler with the set of scheduling parameters $s_{jmin}$ which minimizes an overall error relative to the series t of the test scenarios, which overall error is determined from the indicators obtained by emulation and from the indicators obtained by simulation, which can be written as:

$$s_o = s_{jmin}, \text{ with } jmin = arg_j\left(\min_j \sum_{t_k} \|I_e^{t_k} - I_{s_j}^{t_k}\|\right).$$

The indicators $I_e^{t_k}$ are calculated from calculation traces provided by an emulation tool configured to receive and analyse radio signals originating from the base stations of the test scenario.

An emulation of a test scenario can comprise generating and transmitting, to each base station of the test scenario, starting from the test scenario parameters, a radio signal, called emulated uplink signal. The emulated uplink signal to a base station can correspond to the superimposition of radio uplink signals received by said base station, if said uplink radio signals were transmitted by items of equipment configured according to the parameters of the test scenario.

The emulation can moreover comprise reception of signals, called downlink signals, originating from each base station of the test scenario. This reception can be carried out by an emulation tool, optionally the emulation tool configured for producing the emulation, and/or for calculating the indicators $I_e^{t_k}$.

The simulation can be produced by a simulator, for example by a software simulator configured for producing a simulation when it is run on a computer.

Different distances can be used for determining the overall error, for example the Euclidian distance.

Different distance functions can be used for determining the overall error, for example the mean or also the root-mean-square error.

The implementation of the radio access technology can allow a base station to access a radio resource using the scheduler.

The radio access technology can be the 4G LTE technology, or one of its present or future developments.

The telecommunications network is preferably a mobile network, more preferentially a cellular network.

A test scenario describes a use of a network of base stations implementing the one and the same radio access technology.

A test scenario can be defined by a certain number of parameters such as a list of base stations as well as their position and/or configuration, and/or an environment, for example a height and a type of terrain and/or a quality of a propagation channel, and/or a number of users, a type and/or a quantity of traffic that the users receive and/or generate.

The emulation of a test scenario can utilize as many base stations as base stations used in said test scenario.

Preferably, the base stations used in a test scenario are all identical, i.e. the schedulers of said base stations are all identical.

An indicator can be the number of mobiles with no signal and/or the quality of the propagation channel during the call, and/or the number of users effectively served by the network, and/or the number of resources (average and/or maximum) allocated to each user served by the network, and/or the number of resources (average and/or maximum) allocated to each user the bit rate of which is guaranteed, and/or the packet retransmission rate.

Calibration of the simulation scheduler from the set of parameters which minimizes the relative overall error allows better simulation of the operation of a specific base station of a network, by better simulating the behaviour of its scheduler.

According to a second aspect of the invention, a method is proposed for the simulation of a network having a radio access technology and comprising a plurality of base stations, preferably each implementing one and the same scheduling algorithm, implementing the method according to the first aspect of the invention or one of its improvements, the method according to this second aspect comprising moreover a step of simulating said telecommunications network by utilizing the simulation scheduler calibrated by the scheduling parameters $s_o$.

The method according to the invention can moreover comprise a second simulation of a second network, the preceding network being designated as the first network. The second network can comprise a second plurality of base stations, each preferably implementing a scheduling algorithm identical to that of a base station of the first network, the scheduling parameters calibrated for the first simulation being used as the scheduling parameters of a scheduler of the second simulation.

The simulation of the network from a calibration of the simulation scheduler according to the set of parameters which minimizes the relative overall error makes it possible to better simulate the operation of specific base stations of a network.

In the method according to the first or the second aspect of the invention, or one of their improvements, the test scenarios can be arranged in order and the steps of emulation and simulation of a test scenario are carried out according to the order of the test scenarios. An order of the test scenarios makes it possible to determine more rapidly the set of scheduling parameters which minimizes the overall error than if the test scenarios are not arranged in order.

In the method according to the first or the second aspect of the invention, or one of their improvements, the scheduling parameters are arranged in order and the steps of simulation of a test scenario are carried out according to the order of the scheduling parameters of said test. An order of the scheduling parameters makes it possible to determine more rapidly the set of scheduling parameters which minimizes the overall error than if the test scenarios are not ordered.

According to a preference, in the method according to the first or the second aspect of the invention, or one of their improvements, the series of test scenarios comprises tests, called guaranteed bit rate tests, for which all the users of the test require services at a guaranteed bit rate. These tests make it possible to identify a certain number of parameters specific to this type of service.

Advantageously, in the method according to the first or the second aspect of the invention, or one of their improvements, the series of test scenarios comprises tests, called non-guaranteed bit rate tests, for which all the users of the test require services at a non-guaranteed bit rate. These tests make it possible to identify a certain number of parameters specific to this type of service.

According to an embodiment, in the method according to the first or the second aspect of the invention, or one of their improvements, the series of test scenarios comprises tests, called priority tests, for which all the users of the test require either services at a guaranteed bit rate or services at a non-guaranteed bit rate, the characteristics of the test that are not linked to the presence or absence of a bit rate guarantee remaining identical.

According to yet another aspect of the invention, a computer program product is proposed which is downloadable from a communication network and/or stored on a medium that can be read by a computer and/or executed by a microprocessor which, when it is executed via said support or by said microprocessor, implements the simulation method according to the first or the second aspect of the invention or one of their improvements.

BRIEF DESCRIPTION OF THE DRAWING

Other advantages and characteristics of the invention will become apparent on examination of the detailed description of implementations and embodiments which are in no way limitative, and the attached drawings, in which:

FIG. 1 is a diagram showing the operating principle of a simulation of a network according to the prior art, FIG. 2 is a diagram showing the operating principle of a simulation of a network according to an embodiment of the invention.

DETAILED DESCRIPTION

As these embodiments are in no way limitative, it is possible in particular to consider variants of the invention comprising only a selection of characteristics described below, such as described or generalized, in isolation from the other characteristics described, if this selection of characteristics is sufficient to confer a technical advantage or to differentiate the invention with respect to the prior art.

According to the prior art shown in FIG. 1, a simulation 1 of a network is produced from various data, such as the topology 2 of the network or environmental data 3, such as the altitude or the type of terrain of the network.

The simulation 1 is produced by a simulator comprising a scheduler model 4. The scheduler model 4 is roughly parameterized by the user data 5 of the simulation, without detailed knowledge of an actual scheduler of the network to be simulated.

At the output of the simulation 1, one or more performance(s) 6 of the cellular network is/are obtained.

According to a method 10 according to the invention, a simulation 11 of a telecommunications network is produced implementing a radio access technology and comprising a plurality of base stations.

The simulation of the network is produced from various data, such as the topology 12 of the network or of the environmental data 13, such as the altitude or the type of terrain of the network.

The simulation 11 is produced by a simulator comprising a scheduler model 14. At the output of the simulation 11, one or more performance(s) 16 of the cellular network is/are obtained.

Unlike the prior art, the scheduler model 14 is not parameterized by the user data, but is part of a calibration process 21.

The method 10 proposes calibrating the scheduler model 14 of a base station (not shown) of the network to be simulated by correlating the results originating from a laboratory emulation 22 of a base station 23 identical to the base station of the network with the results of the simulation 11.

The calibration process 21 can comprise performing a certain number of test scenarios both in the laboratory, using the emulation 22, and in a simulation, using the simulator, and comparing the results obtained in order to find the set of parameters which minimizes the differences.

The simulation method 10 comprises, starting from a series t of test scenarios, each test scenario comprising at least one base station, and from a series s of sets of scheduling parameters of the simulation scheduler 14:

for each test scenario $t_k$ of the series of test scenarios t:

producing the emulation 22 of the test scenario $t_k$ utilizing all the base stations 23 of the test scenario $t_k$, in order to obtain a series $I_e^{t_k}$ of indicators, for each set of scheduling parameters $s_j$ of said series of sets of scheduling parameters s, producing a simulation of the test $t_k$ by said simulation scheduler with the set of scheduling parameters $s_j$, in order to obtain a series $I_{s_j}^{t_k}$ of indicators, calibrating 21 the scheduling parameters $s_o$ of the simulation scheduler with the set of scheduling parameters $s_{jmin}$ which minimizes an overall error relative to the series t of the test scenarios, which overall error is determined from the indicators obtained by emulation and from the indicators obtained by simulation, which can be written as:

$$s_o = s_{jmin}, \text{ with } jmin = arg_j\left(\min_j \sum_{t_k} \left\| I_e^{t_k} - I_{s_j}^{t_k} \right\| \right)$$

simulating said telecommunications network by the utilization of the simulation scheduler calibrated by the scheduling parameters $s_o$.

When the test scenario comprises a single base station, the emulation process of a test scenario comprises, over a period of time, generating and transmitting a radio signal, called emulated uplink signal, to the base station.

The emulated uplink signal is, during the period of time, a signal resulting from uplink radio signals which would have been generated by the different terminals, if said uplink radio signals had been transmitted by the different items of equipment configured according to the parameters of the test scenario.

The calibration process 21 can also receive at the input one or more emulation and/or simulation indicators.

The indicators being able to be used are, for example:
the number of users actually served by the network,
the number of resources (average and/or maximum) allocated to each user served by the network,
the number of resources (average and/or maximum) allocated to each user the bit rate of which is guaranteed,
the packet retransmission rate.

The test scenarios can be arranged in a preestablished order, so as to rapidly determine the best set of scheduling parameters.

Of course, the invention is not limited to the examples which have just been described and numerous adjustments can be made to these examples without exceeding the scope of the invention. In addition, the different characteristics, forms, variants and embodiments of the invention can be combined with one another in various combinations inasmuch as they are not incompatible or mutually exclusive.

The invention claimed is:

1. A simulation method for the simulation of a telecommunications network implementing a radio access technology and comprising a plurality of base stations, said method comprising, starting from a series t of test scenarios, each test scenario comprising at least one base station, and from a series s of sets of scheduling parameters of a simulation scheduler:

for each test scenario $t_k$ of the series of test scenarios t:
producing an emulation of the test scenario $t_k$ utilizing all the base stations of the test scenario $t_k$, in order to obtain a series $I_e^{t_k}$ of indicators;

for each set of scheduling parameters $s_j$ of said series of sets of scheduling parameters s, producing a simulation of the test $t_k$ by said simulation scheduler with the set of scheduling parameters $s_j$, in order to obtain a series $I_{s_j}^{t_k}$ of indicators;

calibrating the scheduling parameters $s_o$ of the simulation scheduler with the set of scheduling parameters $s_{jmin}$ which minimizes an overall error relative to the series t of the test scenarios, which overall error is determined from the indicators obtained by emulation and from the indicators obtained by simulation, which can be written as:

$$s_o = s_{jmin}, \text{ with } jmin = arg_j\left(\min_j \sum_{t_k} \left\| I_e^{t_k} - I_{s_j}^{t_k} \right\| \right)$$

simulating said telecommunications network by the utilization of the simulation scheduler calibrated by the scheduling parameters $s_o$.

2. The simulation method according to claim 1, in which the test scenarios are ordered and the emulation and simulation steps of a test scenario are carried out according to the order of the test scenarios.

3. The simulation method according to claim 1, in which the series of test scenarios comprises tests, called guaranteed bit rate tests, for which all the users of the test require services at a guaranteed bit rate.

4. The simulation method according to claim 1, in which the series of test scenarios comprises tests, called non-guaranteed bit rate tests, for which all the users of the test require services at a non-guaranteed bit rate.

5. The simulation method according to claim 1, in which the series of test scenarios comprises tests, called priority tests, for which all the users of the test require either services at a guaranteed bit rate or services at a non-guaranteed bit rate, the characteristics of the test that are not linked to the presence or absence of a guaranteed bit rate remaining identical for all users.

6. A computer program product, comprising a non-transitory computer readable medium having stored thereon computer readable instructions when executed by a microprocessor, implements the simulation method according to claim 1.

7. A simulation system comprising one or more processors configured to perform the simulation method according to claim 1.

* * * * *